United States Patent [19]

Dressler

[11] Patent Number: 5,025,634
[45] Date of Patent: Jun. 25, 1991

[54] HEATING AND COOLING APPARATUS

[76] Inventor: William E. Dressler, 8385 Melrose, Lenexa, Kans. 66214

[21] Appl. No.: 523,118

[22] Filed: May 14, 1990

Related U.S. Application Data

[63] Continuation-in-part of Ser. No. 342,755, Apr. 25, 1989, abandoned.

[51] Int. Cl.[5] .............................................. F25B 7/00
[52] U.S. Cl. ......................................... 62/79; 62/160; 62/238.6; 62/238.7; 62/260
[58] Field of Search .................... 62/238.6, 238.7, 260, 62/503, 160, 79; 165/45

[56] References Cited

U.S. PATENT DOCUMENTS

| | | | |
|---|---|---|---|
| 3,307,368 | 3/1967 | Harnish | 62/160 |
| 3,754,409 | 8/1973 | Wreen, Jr. et al. | 62/503 |
| 3,965,694 | 6/1976 | Vignal et al. | 62/260 |
| 4,217,765 | 8/1980 | Ecker | 62/503 |
| 4,258,780 | 3/1981 | Suo | 62/260 X |
| 4,277,946 | 7/1981 | Bottum | 62/260 X |
| 4,383,419 | 5/1983 | Bottum | 62/238.6 |
| 4,516,629 | 5/1985 | Bingham | 62/260 X |
| 4,570,452 | 2/1986 | Bingham | 62/260 |
| 4,583,377 | 4/1986 | Viegas | 62/503 |
| 4,688,717 | 8/1987 | Jungwirth | 62/260 X |
| 4,741,388 | 5/1988 | Kuroiwa | 165/45 |
| 4,912,937 | 4/1990 | Nakamura et al. | 62/160 |

FOREIGN PATENT DOCUMENTS 3514191  10/1986  Fed. Rep. of Germany .

OTHER PUBLICATIONS

Report entitled "Proceedings of the Workshop on Ground-Source Heat Pumps, Oct. 27–Nov. 1, 1986", by IEA Heat Pump Center.
Excerpt from ASHRAE Handbook, p. 10.1 (1 sheet)–1984.
Excerpt from ASHRAE Handbook, p. 29.1 (1 sheet), Dec.–1990.
Excerpt from marketing memo by Hoosier Energy REC, Sep. 1988 (1 sheet).
Excerpt from marketing memo by Hoosier Energy REC, Dec. 1988 (1 sheet).
Excerpt from marketing memo by Hoosier Energy REC, Jan. 1989 (1 sheet).
Excerpt from marketing memo by Hoosier Energy REC, Feb. 1989 (1 sheet).
Excerpt from marketing memo by Hoosier Energy REC, Jul. 1989 (2 sheets).

(List continued on next page.)

*Primary Examiner*—Lloyd L. King
*Attorney, Agent, or Firm*—Litman, McMahon & Brown

[57] ABSTRACT

A heating and cooling method and apparatus for a single, closed loop configuration for directly exchanging thermal energy with the earth for both heating and cooling purposes. A refrigerant, which is pumped through the apparatus by a compressor, undergoes two phase transitions during each circuit through the loop. A subterranean heat exchanger has a pair of manifolds in flow communication with a plurality of substantially horizontally oriented tubes. Refrigerant flowing through the tubes has sufficient velocity to sweep lubricant oil, which has escaped from the compressor, along with it for return to the compressor. An expansion valving assembly automatically meters and regulates the flow rate and pressure of the refrigerant during both the heating mode and the cooling mode of the apparatus. A refrigerant storage device automatically supplies or accepts the change in quantity of the refrigerant required when the apparatus changes from either the heating or cooling mode to the reverse mode. A bypass mechanism anticipates the low pressure condition which arises at the compressor input during reversal or startup of the apparatus and provides multiple attempts to overcome inertial resistance corresponding thereto. A modified embodiment of the apparatus provides a non-phase-change heat exchanger flow communicating in tandem to remove a portion of the thermal energy for auxiliary thermodynamic purposes.

22 Claims, 1 Drawing Sheet

OTHER PUBLICATIONS

Excerpt from marketing memo by Hoosier Energy REC, Nov. 1989 (1 sheet).

Excerpt from marketing memo by Hoosier Energy REC, Jan. 1990 (1 sheet).

Excerpt from Atthouse, et al., Modern Refrigeration & Air-Conditioning, copyright 1982, Goodheart-Willcox Co., Inc., pp. 693,801 (2 sheets).

Cut sheets from Refrigeration Research, Inc. concerning a suction accumulator (3 sheets), Dec. 1990.

Report entitled, "Design Guidelines for Direct Expansion Ground Coils", May, 1990, by ORNL for EPRI.

Drawing entitled "Project: G. W. Stewart Properties, Inc.", dated 8/28/84 (1 sheet).

Manual entitled "Ground Source DX Heat Pump", developed by Dressler Corporation, 1984, (159 sheets).

Research & development report entitled "System Final Design", by Dressler Energy Corporation, dated 6/22/88 (3 sheets).

Manual entitled "Patented Freon Control System and Earth Coupled Heat Pump Technology", by ECR Tech., Inc. (33 sheets).

Cochran, Robert W., "ECR's Direct Expansion Earth-Coupled Heat Pump System", IEA Heat Pump Center Newsletter, vol. 6, No. 2, (Jun. 1988, pp. 16-20).

Gilmore, V. Elaine, "Neo-Geo Heat Pump", Popular Science, Jun. 1988, pp. 88, 112.

HEATING AND COOLING APPARATUS

CROSS-REFERENCE TO RELATED APPLICATION

This application is a Continuation-In-Part of application Ser. No. 342,755 filed Apr. 25, 1989, now abandoned.

BACKGROUND OF THE INVENTION

1. Field of the Invention.

The present invention relates to a heating and cooling apparatus for heating an environmental or process load by removing thermal energy from the earth and transferring that energy to the load and, similarly, cooling the load by removing thermal energy therefrom and transferring that energy to the earth for dissipation therein.

2. Description of the Related Art.

With the steadily increasing costs of fossil and other depletable types of fuels, which are presently being used to obtain desirable temperature levels in environmental and process loads, greater emphasis is being directed toward developing systems and methods to extract energy from the vast, virtually unlimited thermal energy stored in the earth and transferring that energy to the loads for heating purposes and, reversely, extracting thermal energy from the loads and transferring that energy to the earth for dissipation therein for cooling purposes. One type of previous system for accomplishing such objectives is commonly referred to as a heat pump.

Approaches which have previously been applied on a small scale to accomplish the transfer of useful thermal energy to and from the earth have involved the use of subterranean pipes in flow communication with various above ground devices. A refrigerant coolant, which is pumped through such pipes by a compressor, serves as a carrier to convey thermal energy absorbed from the ground or earth, as a heat source, to the above ground devices for further distribution as desired for heating purposes. Similarly, the coolant carries thermal energy from the above ground devices to the subterranean pipes for dissipation of heat energy into the earth, as a heat sink, for cooling purposes.

In order to simplify installation of such subterranean pipes and to minimize installation costs, the generally preferred configuration of such subterranean pipes is one where such pipes are substantially horizontally oriented. Unfortunately, several complications can arise when the subterranean pipes are installed horizontally.

First, lubricant oil may escape from the compressor while the system is operating. The lubricant oil is carried along with the refrigerant throughout the system. Because of the lower elevation of the subterranean pipes, the lubricant oil tends to accumulate therein. As a result, the compressor is gradually deprived of essential lubricant oil, which jeopardizes the continued successful operation of the compressor. Further, the accumulation of the lubicant oil in the subterranean pipes gradually floods those pipes, substantially reducing the ability of the subterranean pipes to perform their originally intended function.

This problem basically arises from a conflict between two potentially adverse objectives: to maintain a relatively low rate of refrigerant flow through the subterranean pipes whereby the refrigerant can substantially undergo a complete change of phase while transmitting the subterranean pipes as opposed to generating sufficient refrigerant flow velocity through the subterranean pipes to sweep the oil along with the refrigerant to avoid accumulation of the refrigerant oil in the subterranean pipes. Previous attempts to accordingly control the refrigerant flow have included complicated refrigerant distribution configurations.

Second, when an energy demand cycle is completed, the system shuts down to wait for a subsequent demand for energy transfer. As a result, a certain amount of liquid refrigerant then passing through the subterranean pipes will lose its momentum and will remain in the subterranean pipes. When the subsequent energy demand occurs, the compressor, which is generally designed for pumping gas as opposed to pumping liquid, quickly depletes the gaseous refrigerant trapped between the liquid refrigerant, which remains in the subterranean pipes, and the compressor such that a low pressure condition is quickly created at the input of the compressor. Most compressors are generally designed to interpret such a low pressure condition at the input as an indication that insufficient refrigerant exists in the system to properly function. As a result, the compressor automatically shuts down when such a low pressure condition is sensed in order to protect against burn-out of the compressor due to the possible absence of sufficient refrigerant.

A similar but more pronounced low pressure problem is encountered when a reversible system changes from a heating mode to a cooling mode due to a refrigerant capacity imbalance which is inherent in a reversing system. This imbalance results from the much larger volume capacity of the subterranean heat exchanger as compared to the volume capacity of the dynamic load heat exchanger.

When the operating cycle is reversed, additional time must be allowed to manipulate the excess refrigerant whereby the refrigerant can assume its appropriate redistribution throughout the system in order to properly function in the reverse mode. During this remanipulation time period, the low pressure condition is created at the input of the compressor. The generally relatively short time interval allowed for the low pressure condition at the compressor input before shutdown can be insufficient for the compressor to overcome the inertial resistance of the static refrigerant in the subterranean pipes and redistribute the refrigerant for the reverse mode. As previously described, the low pressure condition at the compressor input can cause the compressor to automatically prematurely shut down.

This imbalance can be particularly troublesome during a system start-up at the end of an extended heating cycle where the temperature of the earth surrounding the subterranean pipes has been reduced as a result of extraction of thermal energy therefrom. As a result, a large volume of refrigerant can accumulate in the pipes of the subterranean heat exchanger.

A third problem, which is generally observed for prior art heat pumps, is the absence of a mechanism for achieving refrigerant pressure equalization subsequent to system shutdown to reduce start-up loads and thereby extend service life of the compressor.

Previous attempts to circumvent some of the aforesaid problems have generally followed either of two approaches: (i) using a plurality of closed loop systems working in combination, with one of such loops horizontally or vertically disposed subterraneally, or (ii)

using a vertically disposed, single-closed-loop subterranean exchanger.

The plural loop approach generally utilizes indirect heat exchange rather than direct thermal exchange. This approach basically employs two or more distinct and separate, cooperating, closed loop systems. A first one of such closed loop systems is sequentially routed through the earth and through an interim heat exchanger transferring thermal energy therebetween. The other one of such closed loop systems, which is sequentially routed through the interim heat exchanger and through a dynamic load heat exchanger for further distribution as desired via techniques commonly known in the heating and cooling industry, operably interacts with the first such closed loop system in the interim exchanger. Thus, through the cooperative effort of the two separate closed loop systems, thermal energy is indirectly transferred between the earth and the environmental or process load.

By using a plural loop approach, the oil deprivation problem can be partially resolved by eliminating the refrigerant and oil transitting the subterranean pipes, thereby minimizing the quantity of oil which can be drained away from the compressor or by using a non-phase-change heat transfer fluid in the subterranean portion of such a plural loop system. Such double closed loop systems are substantially more complicated, due to the greater number of components required, and are considerably less efficient than properly designed, single closed loop systems.

The vertical single-closed-loop approach generally utilizes downwardly or vertically inclined subterranean pipes. Such a system can generally be designed to operate in either a heating mode or a cooling mode. Unfortunately, however, the same system will not properly function when operated in a reverse mode due to the disruption caused by the difference in specific density of gaseous refrigerant relative to that of liquid refrigerant. Specifically, while the transition from liquid to gas may be designed to occur while the refrigerant is passing upwardly in one mode of operation, such transition may occur while the refrigerant is passing downwardly in the reverse mode of operation.

Another shortcoming of a vertical loop system is the entrapment of oil at the lower extremities of the vertically oriented pipe, thereby depriving the compressor of essential lubricant oil. In addition, such vertical loop systems require sloped or vertically bored holes for installation of the subterranean pipes; such installations are limited to cooperating sub-soil conditions, such as where borings do not tend to cave-in before the pipe installations can be completed resulting in substantial unnecessary expense.

What is needed is a reversible heating and cooling system having a single closed loop configuration which efficiently and reliably returns lubricant oil to the compressor, which automatically compensates for the fluctuation in quantity of refrigerant which occurs when reversing modes of operation and which anticipates the low pressure condition at the compressor input which arises during system startup and reversal.

SUMMARY OF THE INVENTION

An improved heating and cooling apparatus is provided, during a first mode, to directly extract thermal energy from the earth, functioning as a heat source, with a first or subterranean heat exchanger and to directly transfer that energy to a second or dynamic load heat exchanger for further distribution for heating purposes and, for cooling purposes during a second or reverse mode, to extract thermal energy from the second heat exchanger and to directly transfer that energy to the subterranean heat exchanger for dissipation of that energy into the earth, functioning as a heat sink. A reversing valve in the single closed loop of the heating and cooling apparatus is controlled by a thermostat which switches the system from a heating mode to a cooling mode and vice versa.

The thermal energy is transferred between the subterranean heat exchanger and the dynamic load heat exchanger by pumping a refrigerant therebetween with a refrigerant compression device, such as a compressor. The refrigerant undergoes two phase changes during each pass through the single, closed loop system: a phase transition from gas to liquid in the dynamic load heat exchanger followed by a phase transition from liquid to gas in the subterranean heat exchanger during the heating mode, and a phase transition from gas to liquid in the subterranean heat exchanger followed by a phase transition from liquid to gas in the dynamic load heat exchanger during a cooling mode.

The subterranean heat exchanger comprises a plurality of substantially horizontally oriented, substantially parallel tubes in flow communication with a pair of manifolds. In order to substantially equally distribute the flow of refrigerant through the subterranean heat exchanger tubes, the ends of such tubes are secured to the manifolds whereby the tube having a first end spaced closest to the inlet of a first one of the pair of manifolds has its other end spaced farthest from the inlet of a second one of the pair of manifolds with a similar arrangement provided for each of the other tubes until the last of such tubes which has a first end spaced farthest from the inlet of the first of said manifolds and the other end of such last tube is spaced closest to the inlet of the second of said manifolds. The lateral spacing between the tubes is adapted to enhance the overall efficiency and performance of the system while minimizing or eliminating the potentially inhibiting and insulating effect of frozen ground thereabout during operation of the apparatus.

The mass flow rate of the refrigerant is primarily determined by the volume of refrigerant conveyed through the system by the compressor, the capacity of which is matched to that of the thermal conditioning demands placed on the dynamic load heat exchanger. The lengths and diameters of the tubes of the subterranean heat exchanger are sized to optimize the mass flow of the refrigerant therethrough such that the residence time of the refrigerant per pass through the subterranean heat exchanger is adapted to maximize energy transfer between the earth surrounding the subterranean heat exchanger and the refrigerant flowing therethrough. At the same time, the tubes are sized and adapted to transfer refrigerant therethrough at a relatively high flow velocity such that lubricant oil accumulation in the tubes of the subterranean heat exchanger is prevented. Instead, the oil is swept along with the refrigerant and is subsequently returned to the compressor to restore the oil thereto.

The improved heating and cooling apparatus of the present invention incorporates directional flow controls in combination with a pair of automatic metering devices, one such automatic metering device for regulating the pressure of the refrigerant just prior to the entrance of the refrigerant into the subterranean heat exchanger during the heating mode and another such automatic metering device for regulating both the temperature and pressure of the refrigerant as the refrigerant exits the dynamic load heat exchanger during the cooling mode. The need for two metering devices of different design criteria, as opposed to a single expansion valve as attempted in the prior art using a single closed loop system, is due to the variation of operational conditions required during the heating mode as opposed to those required during the cooling mode, which variation in conditions cannot be accommodated by a single valve, particularly a valve of the thermostatic type.

The improved apparatus reduces start-up load on the refrigerant compression device by providing automatic pressure equalization across the metering devices, which allows line pressure across the metering devices to equalize during each off cycle of the apparatus. As a result, an unencumbered and efficient start-up is provided which extends service life of the refrigerant compression device.

The heating and cooling apparatus incorporates a refrigerant storage device intermediately spaced between the reversing valve and the refrigerant compression device. The refrigerant storage device is adapted to contain a volume of refrigerant equal to at least 50% of the total volume of refrigerant contained in the system. The refrigerant storage device comprises a cavity, which contains the excess liquid refrigerant and a reservoir of the lubricant oil which settles to the bottom of the liquid refrigerant, and an outlet having an orifice, which is spaced internally to the refrigerant storage device and near the lowest elevational extremity of the outlet and which is adapted to remove the lubricant oil and restore the oil to the refrigerant compression device.

The improved apparatus is adapted to provide a time controlled bypass mechanism which enables the refrigerant compression device to anticipate the low-pressure conditions at the input thereof and thereby provides sufficient time for the refrigerant compression device to overcome inertial resistance of the refrigerant during system startup or reversal.

A modified embodiment of the improved apparatus of the present invention provides a non-phase-change heat exchanger for removing some of the thermal energy from the refrigerant for auxiliary applications, such as secondary thermodynamic load, prior to admission of the refrigerant into a phase change heat exchanger.

OBJECTS OF THE INVENTION

Therefore, the objects of the present invention are: to provide a heating and cooling system which performs direct heat exchange with the earth; to provide such a system which provides both heating and cooling capabilities with a single closed loop; to provide such a system with a substantially horizontally oriented subterranean heat exchanger; to provide such a system which substantially balances the flow of refrigerant through a plurality of tubes comprising the subterranean heat exchanger; to provide such a system which transfers refrigerant through the subterranean heat exchanger at sufficient velocity to prevent accumulation of lubricant oil therein; to provide such a system which maximizes the efficiency of energy transfer between a thermal load heat exchanger and the earth surrounding the subterranean heat exchanger; to provide such a system which efficiently returns lubricant oil, which has escaped from a refrigerant compression device, to the refrigerant compression device; to provide such an apparatus which automatically compensates for the fluctuating difference of refrigerant volume requirements when the apparatus switches from the heating mode to the cooling mode and vise versa; to provide such a system which is adapted to automatically meter the flow of refrigerant through the system, both in the heating mode and in the cooling mode; to provide such a system which provides a thermostatically controlled selection of mode of operation, whether heating or cooling; to provide such a system which anticipates the low pressure conditions which arise at the input of the refrigerant compression device during start-up and reversal; to provide a modified system which allows removal of a portion of the thermal energy from the system for auxiliary applications; and to generally provide such an apparatus which is relatively easy to install, simple to maintain, reliable in performance, inexpensive to manufacture, has longer service life, and which generally performs the requirements of its intended purposes.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
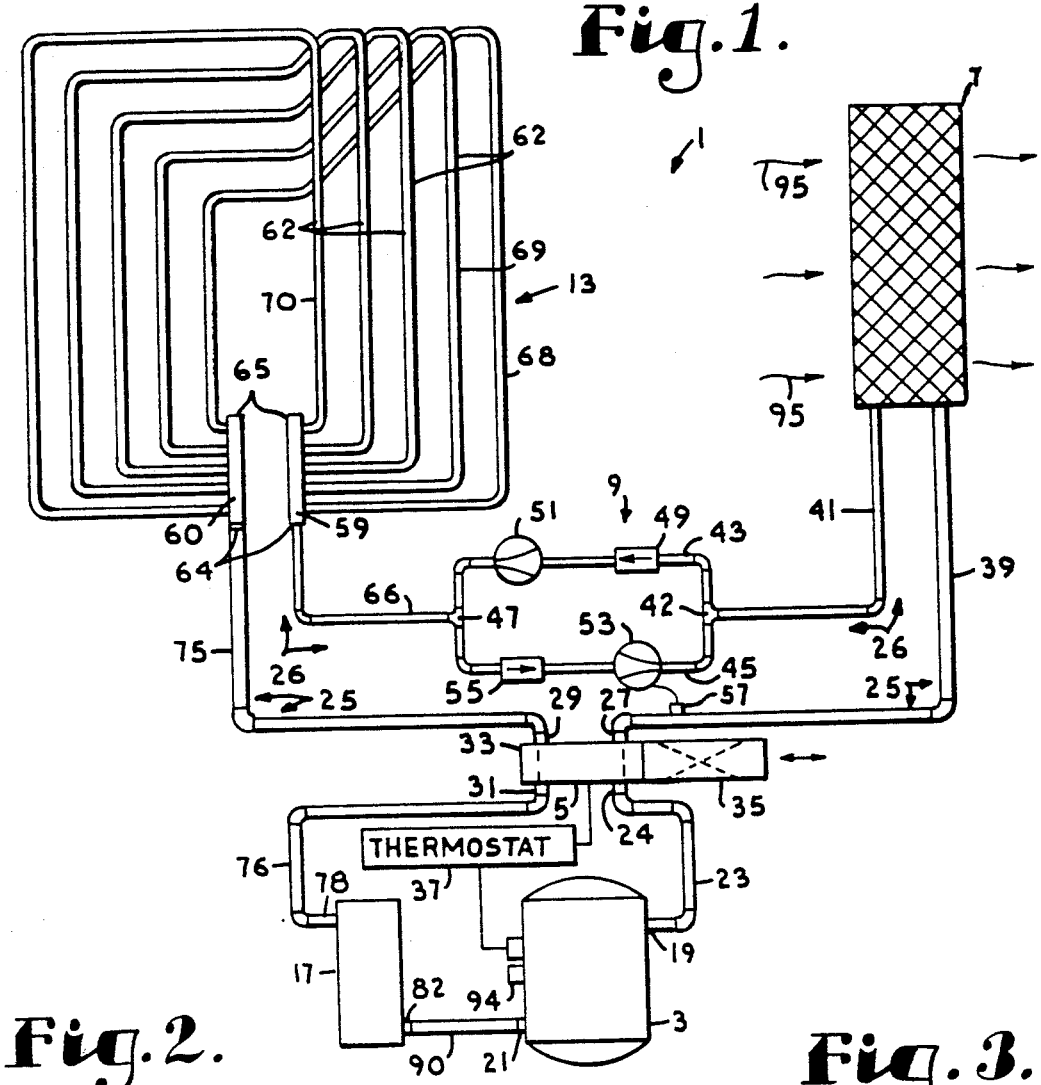
FIG. 1 is a diagrammatic representation, with portions disproportionately sized to disclose details thereof, of a single closed loop, reverse mode heating and cooling apparatus having a subterranean heat exchanger and a refrigerant storage device in accordance with the present invention.
Figure 2:
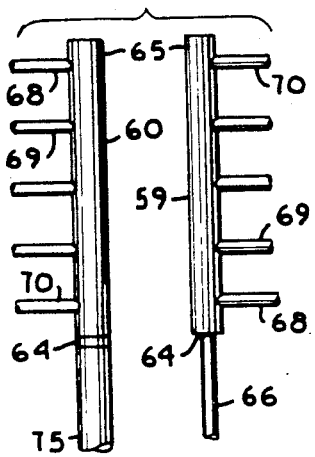
FIG. 2 is an enlarged and fragmentary plan view of input and output manifolds of the subterranean heat exchanger of the heating and cooling apparatus.
Figure 3:
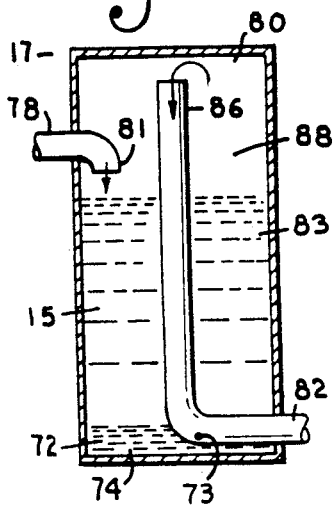
FIG. 3 is an enlarged and fragmentary cross-sectional view of the refrigerant storage device of the heating and cooling apparatus.

The reference numeral 1 generally refers to a heating and cooling apparatus in accordance with the present invention as shown in FIGS. 1 through 3. The heating and cooling apparatus 1 generally comprises a compressor or refrigerant compression device 3, a reversing valve assembly 5, a transfer device or dynamic load heat exchanger 7, an expansion valving assembly 9, a subterranean heat exchanger 13, a refrigerant 15, and a dual-purpose refrigerant storage device 17.

The refrigerant compression device 3, such as a Series CR refrigerant compressor as provided by Copeland Corporation of Rushville, Ind., or the like, has a capacity to cycle a minimum of 2½ pounds of refrigerant per minute per ton of overall system capacity through the apparatus 1 as hereinafter described. The actual capacity of the refrigerant compression device 3 depends upon the heat transfer requirements of a particular application utilizing the present invention. The refrigerant compression device 3 has an output port 19 and an input port 21. The pressure of the refrigerant 15 as it passes through the output port 19 generally ranges between 180 and 250 pounds per square inch (hereinafter "psi"); preferably, the pressure ranges between 220 to 225 psi. A hollow conduit 23, such as refrigerant tubing or the like, constructed of copper or other suitable material, provides means to connect the output port 19 in flow communication with an input port 24 of the reversing valve assembly 5.

The diameter of the conduit 23, which interconnects the various components as herein described into a single closed loop, depends on the overall system heating and cooling capacity of a particular application. For example, for an application requiring a system having a capacity of one-ton, the conduit 23 will have a diameter of approximamaly ⅞ inch. The diameter of conduits in the portion of the closed loop which conveys the refrigerant 15 substantially in a gaseous phase, sometimes herein referred to as a gaseous portion 25 of the apparatus 1 as opposed to a liquid portion 26 wherein the refrigerant 15 is conveyed substantially in a liquid phase, typically ranges in size between approximately ⅞ and 1⅝ inches outside diameter, the actual size for a particular application of the apparatus being dependent upon the overall capacity of the heating and cooling system.

Besides the input port 24, the reversing valve assembly 5 has a dynamic load exchanger port 27, a subterranean exchanger port 29, and a refrigerant storage device port 31. The valve assembly 5 such as a Series 401RD four-way reversing valve as provided by Emerson Electric Co., Alco Controls Division of St. Louis, Miss., or the like, has two basic configurations as shown in FIG. 1: a heating mode configuration 33, wherein the input port 24 is connected in flow communication with the dynamic load exchanger port 27 and the subterranean exchanger port 29 is connected in flow communication with the refrigerant storage device port 31; and a cooling mode configuration 35, wherein the input port 24 is connected in flow communication with the subterranean exchanger port 29 and the dynamic load exchanger port 27 is connected in flow communication with the refrigerant storage device port 31. Switching of the reversing valve assembly 5 from either of the configurations 33 or 35 to the other is electrically controlled by an output from a temperature sensing or control device 37, such as a thermostat as provided by Emerson Electric Co., White-Rogers Division of St. Louis, Miss., or the like.

A conduit 39 connects the dynamic load exchanger port 27 in flow communication with the dynamic load exchanger 7, such as a Series TWV heat pump blower unit as provided by Trane Company, Dealer Products of Tyler, Texas for environmental loads or a Series MPX heat exchanger as provided by Carrier Corporation of Syracuse, N.Y. for process loads, or the like.

A conduit 41 connects the dynamic load exchanger 7 in flow communication with a tee 42 of the expansion valving assembly 9. The tee 42 serves as an inlet for a heating mode branch or leg 43 of the expansion valving assembly 9 and as an outlet for a cooling mode branch or leg 45 of the expansion valving assembly 9. The legs 43 and 45 subsequently converge at a tee 47, which serves as an outlet for the heating mode leg 43 and as an inlet for the cooling mode leg 45.

The refrigerant 15 undegoes a phase change in the dynamic load heat exchanger 7 as hereinafter described. Therefore, the refrigerant 15 in the conduit 41 is liquid. The diameter of the conduit 41 depends on the overall system capacity of a particular application. For example, the conduit 41 for an application requiring a system having a heating and cooling capacity of one-ton has a diameter of approximately ⅜ inch. The diameters of other conduits in the apparatus 1 conveying liquid refrigerant 15 will typically be sized similarly to that of the conduit 41.

The heating mode leg 43 comprises a check valve 49 and a first or heating mode refrigerant flow metering device 51 flow communicating in tandem. The check valve 49 controls the direction of flow of the refrigerant 15 through the heating mode leg 43; the refrigerant 15 is permitted to flow leftwardly through leg 43 as shown in FIG. 1 but is prevented from flowing rightwardly through leg 43. An example of the check valve 49 is a Magna Check as provided by Watsco of Hialeah, Fla.

The flow metering device 51 regulates, modulates and controls the rate of flow of refrigerant 15 therethrough based on the pressure of the refrigerant 15 immediately downstream therefrom, which operably ranges from 70 to 100 psi with a preferable downstream pressure of 90 psi. The metering device 51 has a 20-25% bleed port (not shown) which allows pressure across the device 51 to equalize during each off-cycle of the apparatus 1. Such pressure equalization permits unloaded and efficient system start-up and reversal as hereinafter described and thereby extends the service life of the refrigerant compression device 3. An example of the regulating device 51 is an automatic expansion valve Series ACP as provided by Emerson Electric Co., Alco Controls Division of St. Louis, Miss.

The cooling leg 45 comprises a second or cooling mode refrigerant flow metering device 53 and a check valve 55 flow communicating in tandem. Similarly to the preceding, the check valve 55 controls and modulates the direction of flow of the refrigerant 15 through the cooling mode leg 45; the refrigerant 15 is permitted to flow rightwardly (as shown in FIG. 1), through the leg 45 but is prevented from flowing leftwardly through the leg 45. The metering device 53, such as a Series ANE thermal expansion valve, as provided by Emerson Electric Co., Alco Controls Division of St Louis, Miss., or the like, has a 20-25% bleed port (not shown) for an unloaded and efficient start-up of the refrigerant compression device 3.

A temperature monitoring bulb 57, which is in communication with the metering device 53, is secured to the conduit 39 and monitors the temperature of the refrigerant 15 leaving the exchanger 7 during the cooling mode of the apparatus 1. The bulb 57 regulates the device 53 such that a particular super-heat condition of the refrigerant 15 as it leaves the exchanger 7 is maintained. Operably, the super-heat temperature condition of the refrigerant should range between 7° to 12° F., with a super-heat temperature of 9° being preferred.

The subterranean exchanger 13 comprises a liquid phase manifold 59, a gas phase manifold 60, and a plurality of field tubes 62 in thermal communication with the earth. Each of the manifolds 59 and 60 has a flow end 64 and a closed end 65 and is constructed of copper or other suitable material. When installed, the manifolds 59 and 60 are sufficiently spaced apart to minimize thermal short-circuiting therebetween. The diameters of the manifolds 59 and 60 depend on the overall capacity of the apparatus 1 for a particular application. For example, for a system having a capacity of one-ton, the manifolds 59 and 60 each have a diameter of approximately ⅜ inch. The conduit 66 connects the tee 47 of the expansion valving assembly 9 in flow communication with the liquid phase manifold 59. Preferably, each manifold 59 and 60 has a diameter of not less than a size determined by the equation:

$$\text{size} \geq \tfrac{1}{2}'' + (\tfrac{1}{8}'' \times \text{tons of system capacity}).$$

One end of each of the tubes 62 is rigidly secured to and in flow communication with the manifold 59 while the other end of each of the tubes 62 is rigidly secured to and in flow communication with the manifold 60. In order to substantially equally distribute the flow of refrigerant 15 through the tubes 62, all of the tubes 62 have substantially equal diameters and substantially equal lengths. Also, one of the tubes 62, such as tube 68, which is secured nearest to the flow end 64 of the manifold 59, is also secured nearest to the closed end 65 of the manifold 60. Another one of the tubes 62, such as tube 69, which is secured next nearest to the flow end 64 of the manifold 59, is also secured next nearest to the closed end 65 of the manifold 60. The same pattern of securement of each of the tubes 62 is continued until the last one of the tubes 62, such as tube 70, which is spaced farthest of the tubes 62 from the flow end 64 of the manifold 59 and is spaced farthest of the tubes 62 from the closed end 65 of the manifold 60.

The tubes 62 are generally spaced substantially parallel to each other, are generally substantially spaced apart a minimum of 6 inches (preferably, 10-12 inches), and are configured to form a substantially square pattern, such as that illustrated in FIG. 1. The manifolds 59 and 60 and the tubes 62 are installed substantially horizontally a distance of one to two feet below the frost line normally observed for the locality for a particular installation. For example, the subterranean exchanger 13 would be buried approximately four to five feet below the surface of the earth in the Kansas City, Missouri area. Thus, an excavation approximately 10′×45′ and 4-feet deep is sufficient to install the subterranean exchanger 13. Preferably, the tubes are not encapsulated in order to avoid imposing unnecessary thermal barriers between the refrigerant 15 in the tubes 62 and the earth thereabout.

All joints having exposure to the refrigerant 15 are constructed whereby operational characteristics of the apparatus 1 will not be jeopardized thereby. For example, the tubes 62, when constructed of copper, may be rigidly secured to the manifolds 59 and 60 by use of 15% silver brazing in a nitrogen-purged environment in order to prevent oxidation of the copper which might otherwise flake into the refrigerant 15 and the oil 80 coursing through the apparatus 1, thereby forming a sludge which might accumulate in various components of the apparatus 1 and eventually cause failure thereof.

The apparatus 1 comprises lubricant oil recovery or restoration means, such as an oil reservoir 72 and an orifice 73 in cooperation with special sizing of the tubes 62 such that the refrigerant 15 is caused to pass through the tubes 62 at a relatively high velocity flow rate.

The sizing of the length and diameter of the tubes 62 is adapted to simultaneously satisfy a multiplicity of requirements. First, the length and diameter of the tubes 62 must be sized whereby the refrigerant 15 substantially undergoes a complete phase change while passing through the tubes 62. The most extreme seasonal conditions of the earth embedding the subterranean exchanger is taken into consideration to assure that sufficient surface area is available to permit sufficient heat transfer between the refrigerant 15 passing through the tubes 62 and the earth embedding the tubes 62.

The actual length of the tubes 62 is determined as follows: if the apparatus 1 is being used in the heating mode whereby the refrigerant 15, as a liquid, is introduced into the subterranean exchanger 13 through the manifold 59, substantially 100% of the refrigerant 15 will be converted to a gas by the time it reaches the manifold 60. Conversely, if the apparatus 1 is being used in the cooling mode whereby the refrigerant 15, as a gas, is introduced into the subterranean exchanger 13 through the manifold 60, substantially 100% of the refrigerant 15 will be condensed to a liquid by the time it reaches manifold 59. (The complete change of phase of the refrigerant 15 while passing through the tubes 62 is commonly referred to in the industry as a 100% flashby.)

At the same time, the diameter of the tubes 62 is sized within certain limits, based on the overall capacity of the apparatus 1 for a particular application, to assure that the refrigerant 15 will pass through the tubes 62 with sufficient velocity to operationally sweep the lubricant oil 74, which has escaped from the refrigerant compression device 3, along with the refrigerant 15 and carry the oil 74 back to the oil reservoir 72, even during periods when the oil 74 may exhibit higher viscosity characteristics, such as after a prolonged heating season when the temperature of the earth surrounding the subterranean heat exchanger 13 has dropped. The mass flow rate of the refrigerant 15 through the tubes 62, which is sufficient to sweep the lubricant oil 74 along with the refrigerant 15, is approximately ½ pound of refrigerant 15 per minute with a velocity of at least 12 feet/minute through each of the tubes 62 when using R22 standard freon as the refrigerant 15.

The actual number of tubes 62 comprising the subterranean heat exchanger 13 required to satisfy the various objectives depends on the particular application of the present invention. Preferably, the heating and cooling apparatus 1 has at least one of the tubes 62 for each 2,400 BTU of overall system capacity with a ratio of length to BTU load of 1/24. For example, one application of the present invention having a heating and cooling capacity of one-ton has five copper pipes, each having an outside diameter of ¼ inch and a length of 100 feet. Experience has demonstrated that the outside diameter of the tubes 62 is preferably ¼ inch and the ratio of diameter to length of the tubes 62 is preferably at least 1/4,800.

A conduit 75 connects the gas phase manifold 60 in flow communication with the subterranean exchanger port 29 of the reversing valve assembly 5 and a conduit 76 connects the refrigerant storage device port 31 of the reversing valve assembly 5 in flow communication with an inlet port 78 of the refrigerant storage device 17. The inlet port 78 opens into an upper portion of a cavity 80 contained within the refrigerant storage device 17. A distal end 81 of the inlet port 78 is directed downwardly, as shown in FIG. 3.

The approximate minimum total mass of refrigerant 15 required for the system to properly function is determinable from the equation:

$$\text{mass of refrigerant} \geq 8 + (2 \times \text{tons of system capacity}) \text{ lbs.}$$

The refrigerant storage device 17 is sized to operably store at least 50% of the total volume of refrigerant 15 contained in the apparatus 1. Actual mass will vary as the sizes and lengths of the conduits 23, 39, 41, 66, 75 and 76 vary. For example, the refrigerant storage device 17 for a one-ton system is adapted to store at least 5 pounds of refrigerant 15 therein.

Any of the refrigerant 15 which enters the refrigerant storage device 17 as a liquid immediately joins the other liquid refrigerant 15 in a refrigerant reservoir 83 contained therein. The lubricant oil 74, which is carried along with the refrigerant 15 into the refrigerant storage device 17, has a specific density which is greater than the specific density of the liquid refrigerant 15. As a result, the oil 74 promptly settles to the bottom of the refrigerant storage device 17 to form the oil reservoir 72, as illustrated in FIG. 3.

An outlet 84 of the refrigerant storage device 17 extends substantially interiorally therein with a distal end 86 thereof turned upright, as shown in FIG. 3. The distal end 86 opens into an upper portion 88 of the cavity 80 above the liquid refrigerant reservoir 83 where gaseous refrigerant 15 accumulates.

The orifice 73 is spaced near the lowest elevation of the outlet 84, internally to the refrigerant storage device 17, whereat the lubricant oil 74 can be actively operably removed from the refrigerant storage device 17 and returned to the refrigerant compression device 3 along with gaseous refrigerant 15 removed from the cavity upper portion 88 through the outlet distal end 86.

A conduit 90 connects the outlet 84 in flow communication with the refrigeration compression device input port 21. A low pressure bypass means, such as a low pressure bypass mechanism 94, monitors the pressure of the refrigerant 15 contained in the conduit 90. The bypass mechanism 94 prolongs the permissible duration of time during system start-up or reversal to avoid premature shutdown of the apparatus 1. For example, in a system having a one-ton heating and cooling capacity, the bypass mechanism anticipates and compensates for the aforedescribed low input pressure conditions for a period of approximately 8 minutes before shutting down for approximately five minutes at which time the bypass mechanism anticipates another 8-minutes on, 5-minutes off cycle. After approximately three such attempts, the bypass mechanism permanently allows the system to shut down until attended by service personnel.

In actual operation, the apparatus 1 may be operated in either a cooling mode or a heating mode, but the apparatus cannot be operated in both the heating mode and the cooling mode simultaneously. When the thermostat 37 signals a demand for heat, the apparatus 1 enters the heating mode with the reversing valve assembly 5 assuming the heating configuration 33. The refrigerant compression device 3 activates and begins pumping gaseous refrigerant 15 from the cavity 88 of the refrigerant storage device 17.

If the lubricant oil 74 is present in the oil reservoir 72, the oil 74 is drawn through the orifice 73 and returned to the refrigerant compression device 3 to replenish the oil 74 which has temporarily escaped from the refrigerant compression device 3. If the level of the oil reservoir 72 is too low to be accessed by the orifice 73, then liquid refrigerant 15 will be drawn through the orifice 73 from the liquid refrigerant reservoir 83 and carried into the refrigerant compression device 3 along with the gaseous refrigerant 15. Although the refrigerant compression device 3 is generally designed to pump only refrigerant 15 in its gaseous phase, rather than in its liquid phase, the volume of liquid refrigerant 15 actually drawn into the refrigerant compression device 3 is minimal and harmless.

When the refrigerant 15 is expelled from the refrigerant compression device 3, the refrigerant 15 is in its gaseous phase, with a temperature of approximately 130° F. to 180° F. and a pressure of approximately 220 to 225 psi. After passing through the reversing valve assembly 5, the refrigerant 15 is directed into the dynamic load heat exchanger 7.

A receiving medium, such as air as referenced by numeral 95 in FIG. 1, is simultaneously circulated through and is in thermal communication with the exchanger 7. The refrigerant 15 passing through the exchanger 7 has a substantially warmer temperature than that of the receiving medium 95. As a result, the receiving medium 95 extracts heat energy from the refrigerant 15 passing therethrough, with the medium 95 containing its newly acquired thermal energy then ducted, distributed or transported away from the exchanger 7 and distributed as desired.

As a result of surrendering some of its thermal energy to the conductive medium 95, the refrigerant 15 condenses while passing through the exchanger 7 and exits the exchanger 7 as a liquid. The liquid refrigerant 15 then passes through the check valve 49 and through the metering device 51 where the flow rate of the refrigerant 15 is controllably regulated while it simultaneously undergoes a drop in pressure. The drop in pressure reduces the effective temperature of the refrigerant 15 substantially below the temperature of the earth below the frost-line of the locality.

The liquid refrigerant 15 is then routed into the subterranean heat exchanger 13 through the liquid phase manifold 59. Pressure of the refrigerant 15 entering the subterranean heat exchanger 13 during the heating mode ranges between 70 to 100 psi, preferably 90 psi.

Since all tubes 62 have substantially equal lengths and diameters, the volume of refrigerant 15 flowing through the subterranean heat exchanger 13 is substantially equally distributed between the tubes 62. The mass flow rate of the refrigerant 15 through the tubes 62 is sufficient to sweep any lubricant oil 74, which might otherwise tend to accumulate in the subterranean heat exchanger 13, along with the refrigerant 15 passing therethrough.

As the refrigerant 15 traverses the subterranean heat exchanger 13 during the heating mode of the apparatus 1, the refrigerant 15 is cooler than the earth surrounding the subterranean heat exchanger 13. Thus, the refrigerant 15 absorbs heat energy from the earth, which causes the refrigerant 15 to undergo a phase change from liquid to gas before the refrigerant 15 reaches the gas phase manifold 60.

As the heating season continues, however, the earth surrounding the embedded subterranean heat exchanger 13 will cool down, reducing the temperature gradient between the earth and the refrigerant 15 in the tubes 62. Thus, the subterranean heat exchanger 13 loses some of its ability to transfer heat energy from the earth to the refrigerant 15 traversing the tubes 65. As a result, some of the refrigerant 15 which enters the subterranean heat exchanger 13 as a liquid may also exit the subterranean heat exchanger 13 as a liquid due to an incomplete phasal transition from liquid to gas therein.

The unconverted liquid refrigerant 15 will not pool in the subterranean heat exchanger 13, however, but will also be swept along with the gaseous refrigerant 15, through the reversing valve assembly 5, and into the refrigerant storage device 17 to complete the circuit of refrigerant 15 through the apparatus 1 during the heating mode thereof. Pressure of the refrigerant 15 entering the refrigerant storage device 17 generally ranges from 40 to 60 psi. When the heating demand which initiated the heating cycle has been satisfied, as signalled by the thermostat 37, the refrigerant compression device 3 shuts down to await a subsequent demand from the thermostat 37. (Immediately after such shutdown, the bleeder port of the metering device 51 will equalize the pressure differential in the apparatus 1.)

Upon receipt of the next demand, the refrigerant compression device 3 may encounter some internal resistance to flow of the refrigerant 15 through the apparatus 1 due to a portion of the liquid refrigerant 15 residing in the tubes 62 of the subterranean heat exchanger 13, this characteristic being more prevalent near the later portion of a heating season when the earth surrounding the subterranean heat exchanger 13 has experienced some cooling due to the extraction of heat energy therefrom. Because of such inertial resistance, the refrigerant compression device produces a prolonged, reduced pressure at the input 21 of the refrigerant compression device 3.

To prevent a premature shutdown of the refrigerant compression device 3 and to permit sufficient time to allow the refrigerant compression device 3 to overcome such inertial resistance, the low pressure bypass mechanism 94 postpones the automatic shutdown signal. If the inertial resistance has not been overcome within a preset period of time, the refrigerant compression device 3 does shut down. After a relatively short delay, the mechanism 94 is adapted to conduct a plurality of attempts to overcome the inertial resistance before permanently shutting down the compressor 3 until serviced. Alternatively, a microprocessor and associated circuitry may be utilized to control the number and timing of such attempts to overcome such inertial resistance.

When the thermostat 37 signals a demand for cooling, the apparatus 1 changes to a cooling mode by switching the reversing valve assembly 5 to the cooling configuration 35. In the cooling mode, routing of the refrigerant 15 through the refrigerant compression device 3 and the portion of the apparatus 1 situated between the refrigerant compression device 3 and the reversing valve assembly 5 is substantially the same as the routing of the refrigerant 15 during the heating mode. However, routing of the refrigerant 15 through the remainder of the apparatus 1 during the cooling mode is in the opposite direction from that of the heating mode.

Specifically, the gaseous refrigerant 15 leaving the refrigerant compression device 3 is directed by the reversing valve assembly 5 from the reversing valve input port 24 to the subterranean exchanger port 29 where the refrigerant 15 is routed through the gas phase manifold 60 into the subterranean heat exchanger 13. Pressure of the refrigerant 15 entering the subterranean heat exchanger 13 during the cooling mode ranges between 180 to 275 psi, preferably 225-250 psi.

As the refrigerant 15 traverses the tubes 62, which are in thermal communication with the earth, the refrigerant 15, which has a temperature which is substantially warmer than that of the earth surrounding the tubes 62, transfers thermal energy to the earth by heat conduction through the tubes 62. As such thermal energy is transferred, the gaseous refrigerant 15 condenses into a liquid. As previously described, the length and diameter of each of the tubes 62 is such that the refrigerant 15 entering the exchanger 13 is substantially entirely converted to a liquid while the refrigerant 15 is passing through the exchanger 13 and before the refrigerant 15 reaches the liquid phase manifold 59. The flow velocity of the refrigerant 15 is sufficient to sweep any of the lubricant oil 74 along therewith as aforedescribed.

When the refrigerant 15 exits from the subterranean heat exchanger 13 and enters the expansion valving assembly 9, the refrigerant 15 is prevented from passing through the heating mode leg 43 by the check valve 49. Instead, the refrigerant 15 passes through the check valve 55 and the cooling mode flow metering device 53 of the cooling mode leg 45 of the expansion valving assembly 9. As the liquid refrigerant 15 passes through the metering device 53, the flow rate of the refrigerant 15 is controllably regulated while it undergoes a substantial drop in pressure. The drop in pressure reduces the effective temperature of the refrigerant 15 substantially below the temperature of the receiving medium 95 passing through the dynamic load heat exchanger 7.

Upon exiting the expansion valving assembly 9, the liquid refrigerant 15 is routed through the dynamic load heat exchanger 7. The refrigerant 15 in the dynamic load heat exchanger 7 is substantially cooler than that of the receiving medium 95 being circulated thereabout. As a result, the refrigerant 15 absorbs heat energy from the receiving medium 95, which cools the receiving medium 95 for other uses, either locally or remote from the exchanger 7. As the refrigerant 15 passes through the exchanger 7, the absorption of heat energy from the receiving medium 95 causes the refrigerant 15 to undergo a transition from the liquid phase to the gaseous phase.

The temperature monitoring bulb 57 monitors the temperature of the gaseous refrigerant 15 after it exits the heat exchanger 7 and is being routed to the reversing valve assembly 5. The output from the bulb 57 is adapted to control the flow of refrigerant 15 to the exchanger 7 by modulating the metering device 53 in response to such pressure and temperature measurements supplied by the temperature monitoring bulb 57.

The refrigerant storage device 17 performs another very important function. The internal volume of the dynamic load heat exchanger 7 for containing the refrigerant 15 is substantially smaller than the corresponding volume of the subterranean heat exchanger 13. Thus, as the apparatus 1 switches from its heating mode to its cooling mode, or vice versa, either a requirement to remove substantial excess refrigerant 15, or a requirement to provide substantial additional refrigerant 15, is placed on the apparatus 1. The capacity of the refrigerant storage device 17 is adapted to automatically provide a source for supplying and a sink for absorbing such fluctuating demands on the refrigerant 15.

Figure 4:
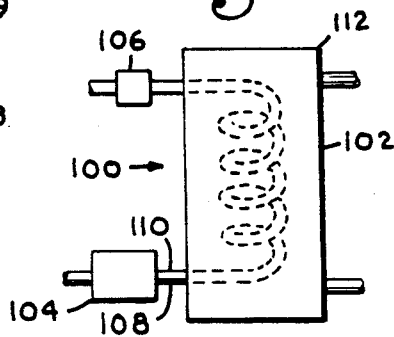
FIG. 4 is a fragmentary schematic view of a modified heating and cooling apparatus according to the present invention, showing an auxiliary, non-phase-change heat exchanger.

A modified embodiment 100 of a heating and cooling apparatus in accordance with the present invention is shown in FIG. 4. Many of the characteristics of the modified embodiment are substantially similar to those already described herein and will not be reiterated here.

A non-phase-change heat exchanger 102 is inserted in tandem between a refrigerant compression device 104 and a reversing valve 106 (both shown schematically in FIG. 4). A conduit 108 circulates a gaseous refrigerant 110 through the heat exchanger 102. A receiving medium 112, such as water or another suitable medium, is simultaneously circulated through the heat exchanger 102.

The temperature of the refrigerant 110 is warmer than the temperature of the medium 112 such that a temperature gradient exists therebetween. As a result, some of the thermal energy contained in the refrigerant 110 is transferred to the medium 112, which is then transported elsewhere for further application. The rate of transfer of thermal energy from the refrigerant 110 to the medium 112 is controlled such that the refrigerant 110 leaving the heat exchanger 102 is still substantially in a gaseous phase.

It is foreseen that a plurality of such non-phase-change heat exchangers 102, either in flow communication in parallel or in tandem, could be integrated into the heating and cooling apparatus 100 in accordance with the present invention.

It is to be understood that while certain forms of the present invention have been illustrated and described herein, it is not to be limited to the specific forms or arrangement of parts described and shown.

What is claimed and desired to be secured by Letters Patent is as follows:

1. In a heating and cooling apparatus having a subterranean heat exchanger in thermal communication with the earth, a dynamic load heat exchanger in thermal communication with a dynamic load, a refrigerant for conveying thermal energy through said apparatus, said refrigerant alternately undergoing gas-to-liquid and liquid-to-gas phase changes while being directed through said apparatus, and a compressor for cycling said refrigerant through said apparatus, said compressor containing a lubricant, the improvement comprising:
    (a) said subterranean heat exchanger being oriented substantially horizontally and including a pair of manifolds and a plurality of tubes fluidically interconnecting said manifolds;
    (b) reversing valve means for selectively and reversibly interconnecting said compressor with said subterranean heat exchanger and said dynamic load heat exchanger for reversing the direction and sequence of refrigerant flow through said heat exchangers; and
    (c) lubricant recovery means for recovering said lubricant from said subterranean exchanger and for restoring said recovered lubricant to said compressor.

2. The heating and cooling apparatus according to claim 1 which includes:
    (a) said subterranean heat exchanger having a pair of manifolds; and
    (b) a tube fluidically connecting said manifolds.

3. In a heating and cooling apparatus having a subterranean heat exchanger in thermal communication with the earth, a dynamic load heat exchanger in thermal communication with a dynamic load, a refrigerant for conveying thermal energy through said apparatus, said refrigerant alternately undergoing gas-to-liquid and liquid-to-gas phase changes while being directed through said apparatus, and a compressor for cycling said refrigerant through said apparatus, said compressor containing a lubricant, the improvement comprising:
    (a) said subterranean heat exchanger being oriented substantially horizontally;
    (b) reversing valve means for selectively and reversibly interconnecting said compressor with said subterranean heat exchanger and said dynamic load heat exchanger for reversing the direction and sequence of refrigerant flow through said heat exchangers;
    (c) lubricant recovery means for recovering said lubricant from said subterranean exchanger and for restoring said recovered lubricant to said compressor;
    (d) said subterranean heat exchanger having a pair of manifolds;
    (e) a tube fluidically connecting said manifolds; and
    (f) a plurality of tubes having substantially equal lengths and equal diameters wherein a first end of each tube of said plurality of tubes is rigidly secured to and in flow communication with a first manifold of said pair of manifolds and a second end of each tube of said plurality of tubes is rigidly secured to and in flow communication with a second manifold of said pair of manifolds, and wherein said first end of a first tube of said plurality of tubes is spaced nearest to said inlet of said first manifold and said second end of said first tube is spaced farthest from said inlet of said second manifold, said first end of a second tube of said plurality of tubes is spaced next nearest to said inlet of said first manifold and said second end of said second tube is spaced next farthest from said inlet of said second manifold, and each successive tube of said plurality of tubes is similarly spaced relative to said inlets of said pair of said manifolds, including the last tube of said plurality of tubes wherein said first end of said last tube is spaced farthest from said inlet of said first manifold and said second end of said last tube is spaced nearest to said inlet of said second manifold.

4. The heating and cooling apparatus according to claim 3 wherein:
    (a) said refrigerant substantially undergoes two phase transitions during each cycle through said apparatus.

5. The heating and cooling apparatus according to claim 4 including:
    (a) a non-phase-change heat exchanger connected in flow communication with said apparatus.

6. The heating and cooling apparatus according to claim 3 wherein:
    (a) each said tube has a diameter-to-length ratio of at least 1/4,800.

7. The heating and cooling apparatus according to claim 6 wherein:
    (a) a minimum mass flow rate of 0.5 pounds per minute of the refrigerant at a minimum flow velocity of 12 feet per minute is operably caused to flow through each of said tubes.

8. The heating and cooling apparatus accordingly to claim 3 wherein:

(a) said lubricant recovery means comprises structure for causing the refrigerant to flow through said apparatus with sufficient velocity to sweep said lubricant oil along with said refrigerant and for collecting and restoring said lubricant oil to said compressor.

9. The heating and cooling apparatus according to claim 3 including:
(a) refrigerant storage means for storing excess refrigerant contained in said apparatus.

10. The heating and cooling apparatus according to claim 9 wherein:
(a) said refrigerant storage means is a refrigerant storage device to furnish said refrigerant when said apparatus changes to a mode which operably requires a greater quantity of refrigerant and to collect and store said refrigerant when said apparatus changes to a mode which operably requires a lesser quantity of refrigerant.

11. The heating and cooling apparatus according to claim 10 wherein:
(a) said refrigerant storage device includes means to contain and store at least 50% of the total quantity of said refrigerant contained in said apparatus.

12. The heating and cooling apparatus according to claim 10, including:
(a) a low pressure bypass means for overcoming premature shutdown when said mode of operation of said apparatus is reversed either from said heating mode to said cooling mode or from said cooling mode to said heating mode.

13. The heating and cooling apparatus according to claim 1 including:
(a) an expansion valving assembly having a heating mode branch and a cooling mode branch.

14. In a heating and cooling apparatus having a subterranean heat exchanger in thermal communication with the earth, a dynamic load heat exchanger in thermal communication with a dynamic load, a refrigerant for conveying thermal energy through said apparatus, said refrigerant alternately undergoing gas-to-liquid and liquid-to-gas phase changes while being directed through said apparatus, and a compressor for cycling said refrigerant through said apparatus, said compressor containing a lubricant, the improvement comprising:
(a) said subterranean heat exchanger being oriented substantially horizontally;
(b) reversing valve means for selectively and reversibly interconnecting said compressor with said subterranean heat exchanger and said dynamic load heat exchanger for reversing the direction and sequence of refrigerant flow through said heat exchangers;
(c) lubricant recovery means for recovering said lubricant from said subterranean exchanger and for restoring said recovered lubricant to said compressor; and
(d) an expansion valving assembly having a heating mode branch and a cooling mode branch; said cooling mode branch restricting said refrigerant from flowing therethrough during a heating mode of said apparatus and permitting said refrigerant to flow therethrough during a cooling mode of said apparatus; said cooling mode branch comprising a second metering device which is adapted to modulate the flow of said refrigerant therethrough; said cooling mode metering device further adapted to equalize a pressure differential thereacross during each off cycle of said apparatus.

15. In a heating and cooling apparatus having a subterranean heat exchanger in thermal communication with the earth, a dynamic load heat exchanger in thermal communication with a dynamic load, a refrigerant for conveying thermal energy through said apparatus, said refrigerant alternately undergoing gas-to-liquid and liquid-to-gas phase changes while being directed through said apparatus, and a compressor for cycling said refrigerant through said apparatus, said compressor containing a lubricant, the improvement comprising:
(a) said subterranean heat exchanger being oriented substantially horizontally;
(b) reversing valve means for selectively and reversibly interconnecting said compressor with said subterranean heat exchanger and said dynamic load heat exchanger for reversing the direction and sequence of refrigerant flow through said heat exchangers;
(c) lubricant recovery means for recovering said lubricant from said subterranean exchanger and for restoring said recovered lubricant to said compressor; and
(d) an expansion valving assembly having a heating mode branch and a cooling mode branch; said heating mode branch permitting said refrigerant to flow therethrough during a heating mode of said apparatus and restricting said refrigerant from flowing therethrough during a cooling mode of said apparatus; said heating mode branch comprising a first metering device which is adapted to modulate the flow of said refrigerant therethrough; said heating mode metering device being further adapted to equalize a pressure differential thereacross during each off cycle of said apparatus.

16. In a heating and cooling apparatus having a subterranean heat exchanger in thermal communication with the earth, a dynamic load heat exchanger in thermal communication with a dynamic load, a refrigerant for conveying thermal energy through said apparatus, said refrigerant alternately undergoing gas-to-liquid and liquid-to-gas phase changes while being directed through said apparatus, and a compressor for cycling said refrigerant through said apparatus, said compressor containing a lubricant, the improvement comprising:
(a) said subterranean heat exchanger being oriented substantially horizontally;
(b) reversing valve means for selectively and reversibly interconnecting said compressor with said subterranean heat exchanger and said dynamic load heat exchanger for reversing the direction and sequence of refrigerant flow through said heat exchangers;
(c) lubricant recovery means for recovering said lubricant from said subterranean exchanger and for restoring said recovered lubricant to said compressor; and
(d) a common refrigerant and oil reservoir.

17. A heating and cooling apparatus comprising:
(a) a single closed loop structure which comprises: a temperature control device and a refrigerant compression device, which is in flow communication with a subterranean heat exchanger, which is in flow communication with a dynamic load heat exchanger, which is in flow communication with a reversing valve assembly, which is in flow communication with an expansion valving mechanism, which is in flow communication with a refrigerant storage device;

(b) said apparatus having a heating mode for heating purposes and a cooling mode for cooling purposes;

(c) said refrigerant compression device adapted to cause a refrigerant to flow through said closed loop; said refrigerant compression device comprising a mechanism for anticipating and compensating for operable low pressure conditions at an input thereof;

(d) said subterranean heat exchanger being substantially horizontally disposed, embedded, and spaced subterraneanly in the earth at least one foot below a local mean frost-line; said subterranean heat exchanger comprising a pair of manifolds rigidly secured to an in flow communication with a plurality of substantially parallel tubes spaced at least 6 inches apart from each other; said tubes having substantially equal lengths and equal diameters; each of said tubes being rigidly secured to and in flow communication with each of said manifolds such that a first end of a first tube of said plurality of said tubes is spaced nearest to an inlet of a first manifold of said pair of manifolds and a second end of said first tube is spaced farthest from an inlet of a second manifold of said pair of manifolds, and a first end of a second tube of said plurality of said tubes is spaced next nearest to said inlet of said first manifold and a second end of said second tube is spaced next farthest from said inlet of said second manifold, and each successive tube of said plurality of said tubes is similarly spaced relative to said inlets of said first and said second manifolds including a last tube of said plurality of said tubes wherein a first end of said last tube is spaced farthest from said inlet of said first manifold and a second end of said last tube is spaced nearest to said inlet of said second manifold; said tubes adapted to thermally react with the earth thereabout such that said refrigerant passing therethrough substantially operably undergoes a phase change transition from liquid to gas during a heating mode of said apparatus and undergoes a phase transition from gas to liquid during a cooling mode of said apparatus prior to exiting from said tubes; said tubes further adapted to cause said refrigerant to pass therethrough with sufficient velocity to prevent accumulation therein of lubricant oil which has escaped from said refrigerant compression device; said subterranean heat exchanger adapted to extract thermal energy from the earth during a heating mode of said apparatus; said subterranean heat exchanger adapted to dissipate thermal energy into the earth during a cooling mode of said apparatus;

(e) said dynamic load exchanger adapted to provide thermal energy to a receiving medium for further disposition during a heating mode of said apparatus; said dynamic load heat exchanger adapted to extract thermal energy from said receiving medium during a cooling mode of said apparatus; said dynamic load heat exchanger adapted to provide a desired rate and quantity of thermal energy exchange with said receiving medium; said dynamic load heat exchanger adapted to thermally react with said receiving medium such that the refrigerant passing therethrough substantially undergoes a phase transition from gas to liquid during a heating mode of said apparatus and undergoes a phase transition from liquid to gas during a cooling mode of said apparatus prior to exiting from said dynamic load heat exchanger;

(f) said reversing valve assembly having a first configuration for said heating mode of said apparatus wherein said refrigerant received from said refrigerant compression device is sequentially routed first through said dynamic load heat exchanger then through said subterranean heat exchanger, and a second configuration for said cooling mode of said apparatus wherein said refrigerant received from said refrigerant compression device is sequentially routed first through said subterranean heat exchanger then through said dynamic load heat exchanger;

(g) said temperature control device adapted to activate said apparatus when a demand for energy transfer is sensed and to deactivate said apparatus when said demand is satisfied; said temperature control device adapted to activate said first configuration of said reversing valve assembly when said apparatus is operating in said heating mode, and to activate said second configuration of said reversing valve assembly when said apparatus is operating in said cooling mode;

(h) said expansion valving assembly spaced between said subterranean heat exchanger and said dynamic load heat exchanger; said expansion valving assembly comprising a heating mode branch and a cooling mode branch; said heating mode branch permitting said refrigerant to operably flow therethrough during said heating mode of said apparatus and restricting said refrigerant from operably flowing therethrough during said cooling mode of said apparatus; said heating mode branch comprising a first metering device for regulating the flow rate and pressure of said refrigerant while flowing from said dynamic load heat exchanger to said subterranean heat exchanger; said cooling mode branch restricting said refrigerant from operably flowing therethrough during said heating mode of said apparatus and permitting said refrigerant to flow therethrough during said cooling mode of said apparatus; said cooling mode branch comprising a second metering device for regulating the flow rate and pressure of said refrigerant while flowing from said subterranean heat exchanger to said dynamic load heat exchanger; said heating mode and said cooling mode branch each adapted to equalize pressure thereacross during each off cycle of said apparatus; and (i) said refrigerant storage device spaced between said refrigerant compression device and said reversing valve assembly; said refrigerant storage device having an inlet and an outlet; said outlet extending internally within said refrigerant storage device and opening in close proximity to an upper extremity of a cavity contained within said refrigerant storage device; said outlet having an orifice spaced in close proximity to a lowest extremity of said cavity; said refrigerant storage device adapted to automatically supply said refrigerant to said apparatus when said apparatus changes to one of said heating and cooling modes which operably requires a greater quantity of said refrigerant and to automatically receive said refrigerant from said apparatus when said apparatus changes to the other of said heating and cooling modes which operably requires a lesser quantity of said refrigerant.

18. The heating and cooling apparatus according to claim 17 including:
(a) a non-phase-change heat exchanger imposed in said closed single loop between and in flow communication with said refrigerant compression device and said reversing valve assembly.

19. A method for extracting thermal energy from the earth for heating purposes and diverting thermal energy to the earth for cooling purposes, comprising the steps of:
(a) providing a thermostatically controlled, single closed loop system containing a refrigerant, said loop having a gaseous portion whereat said refrigerant is substantially in a gaseous phase, and a liquid portion whereat said refrigerant is substantially in a liquid phase; a dynamic load heat exchanger disposed in said loop at a first juncture between said gaseous portion and said liquid portion; a subterranean heat exchanger similarly disposed in said loop at a second juncture between said gaseous portion and said liquid portion; said subterranean heat exchanger substantially horizontally oriented and disposed below the frost-line of the locality; a compressor for cycling said refrigerant through said loop and a reversing valve assembly having a heating mode configuration for extracting thermal energy from the earth and a cooling mode configuration for diverting thermal energy to the earth;
(b) placing said reversing valve assembly in said heating mode configuration; followed by
 (1) compressing said refrigerant in said gaseous portion with said compressor such that said refrigerant acquires a temperature which is substantially warmer than a receiving medium which is in thermal communication with said dynamic load heat exchanger;
 (2) removing thermal energy from said refrigerant by conveying said refrigerant through said dynamic load heat exchanger wherein said refrigerant substantially undergoes a gas-to-liquid phase transition while simultaneously transferring said thermal energy to said receiving medium for distribution elsewhere for heating purposes;
 (3) simultaneously controllably regulating the flow rate and reducing the pressure of said liquid refrigerant such that the effective temperature of said refrigerant is substantially less than the temperature of the earth below the frost-line of the locality;
 (4) extracting thermal energy from the earth with said refrigerant by passing said refrigerant at a relatively high velocity through said subterranean heat exchanger; said velocity of said refrigerant sufficient to sweep any lubricant oil, which may have escaped from said compressor along with said lubricant; said refrigerant substantially undergoing a liquid-to-gas phase transition by absorbing thermal energy from the earth while passing through said subterranean heat exchanger;
 (5) returning said refrigerant with said escaped lubricant oil to said compressor completing the cycle of said refrigerant through said single closed loop system and restoring said escaped lubricant oil to said compressor;
(c) placing said reversing valve assembly in said cooling mode configuration; followed by:
 (1) compressing said refrigerant in said gaseous portion with said compressor such that said refrigerant acquires a temperature which is substantially warmer than the earth which is in thermal communication with said subterranean heat exchanger;
 (2) diverting thermal energy to the earth from said refrigerant by conveying said refrigerant through said subterranean heat exchanger wherein said refrigerant is conveyed therethrough with sufficient velocity to sweep any said escaped lubricant oil along with said refrigerant; said refrigerant substantially undergoing a gas-to-liquid phase transition while passing through said subterranean heat exchanger;
 (3) simultaneously controllably regulating the flow rate and reducing the pressure of said liquid refrigerant such that the effective temperature of said refrigerant is substantially less than the temperature of said receiving medium in thermal communication with said dynamic load heat exchanger;
 (4) absorbing thermal energy from and cooling said receiving medium by conveying said refrigerant through said dynamic load heat exchanger; said refrigerant substantially undergoing a liquid-to-gas phase transition while passing through said dynamic load heat exchanger;
 (5) returning said refrigerant with said extracted lubricant oil to said compressor completing the cycle of said refrigerant through said single closed loop system and restoring said escaped lubricant oil to said compressor.

20. The process according to claim 19, including the steps of:
(a) providing a refrigerant storage device disposed in said gaseous portion of said loop, said refrigerant storage device adapted to accommodate the difference in quantity of said refrigerant required for said heating mode of said system as opposed to that required for said cooling mode of said system;
(b) in said heating mode,
 (1) collecting said refrigerant with said lubricant oil leaving said subterranean heat exchanger in said lubricant storage device wherein said lubricant oil settles to the bottom of said refrigerant storage device;
 (2) extracting said refrigerant from said refrigerant storage device as a gas from the refrigerant vapor above a reservoir of the liquid refrigerant therein while simultaneously extracting said settled lubricant oil through an orifice adapted therefor; and
(c) in said cooling mode,
 (1) collecting said refrigerant with said lubricant oil in said lubricant storage device as aforesaid;
 (2) extracting said refrigerant and said lubricant oil from said lubricant storage device as aforesaid.

21. The process according to claim 20, including the steps of:
(a) providing a low pressure bypass mechanism for anticipating low pressure conditions at an input of said compressor during startup or reversal of said system.

22. The method according to claim 21, including the step of:
(a) extracting thermal energy from said refrigerant without causing a phase change transition thereof, prior to cycling said refrigerant through either said dynamic load heat exchanger or said subterranean heat exchanger.

* * * * *